ANALOG-TO-DIGITAL CONVERTER

Filed March 10, 1966 3 Sheets-Sheet 1

INVENTOR.
HJALMAR OTTESEN
BY
Fraser and Bogucki
ATTORNEYS

ANALOG-TO-DIGITAL CONVERTER

Filed March 10, 1966 3 Sheets-Sheet 2

| STEP | | VOLTAGE AT SUMMING JUNCTION REFERRED TO INPUT | COMPARATOR REFERENCE VOLTAGE REFERRED TO INPUT | DECISION OF COMPARATOR |
|---|---|---|---|---|
| 1. | SIGN COMPARISON | 3.03100 | 0.00000 | VOLTAGE POSITIVE |
| 2. | TURN ON $2^{14}$ AND $2^{13}$ | −1.96900 | −2.50000 | RESET $2^{13}$ |
| 3. | TURN ON $2^{12}$ | −1.96900 | −1.25000 | HOLD $2^{12}$ |
| 4. | TURN ON $2^{11}$ | −1.96900 | −1.87500 | HOLD $2^{11}$ |
| 5. | TURN ON $2^{10}$ | −1.96900 | −2.18750 | RESET $2^{10}$ |
| 6. | TURN ON $2^{9}$ | −1.96900 | −2.03125 | RESET $2^{9}$ |
| 7. | TURN ON $2^{8}$ | −1.96900 | −1.95313 | HOLD $2^{8}$ |
| 8. | TURN ON $2^{7}$ | −1.96900 | −1.99219 | RESET $2^{7}$ |
| 9. | TURN ON $2^{6}A$ | −1.96900 | −1.97266 | RESET $2^{6}A$ |
| 10. | TURN ON $2^{6}B$ AND $2^{6}D$ | −1.98853 | −1.97266 | RESET $2^{6}B$ |
| 11. | TURN ON $2^{5}$ | −1.97877 | −1.97266 | RESET $2^{5}$ |
| 12. | TURN ON $2^{4}$ | −1.97388 | −1.97266 | RESET $2^{4}$ |
| 13. | TURN ON $2^{3}$ | −1.97144 | −1.97266 | HOLD $2^{3}$ |
| 14. | TURN ON $2^{2}$ | −1.97266 | −1.97266 | HOLD $2^{2}$ |
| 15. | TURN ON $2^{1}$ | −1.97327 | −1.97266 | RESET $2^{1}$ |
| 16. | TURN ON $2^{0}$ | −1.97296 | −1.97266 | RESET $2^{0}$ |

POSITIVE CONVERSION

FIG. 2

INVENTOR.
HJALMAR OTTESEN
BY
Fraser and Bogucki
ATTORNEYS

| STEP | VOLTAGE AT SUMMING JUNCTION REFERRED TO INPUT | COMPARATOR REFERENCE VOLTAGE REFERRED TO INPUT | DECISION OF COMPARATOR |
|---|---|---|---|
| 1. SIGN COMPARISON | -3.03100 | 0.00000 | VOLTAGE NEGATIVE |
| 2. TURN ON $2^{13}$ | -3.03100 | -2.50000 | HOLD $2^{13}$ |
| 3. TURN ON $2^{12}$ | -3.03100 | -3.75000 | RESET $2^{12}$ |
| 4. TURN ON $2^{11}$ | -3.03100 | -3.12500 | RESET $2^{11}$ |
| 5. TURN ON $2^{10}$ | -3.03100 | -2.81250 | HOLD $2^{10}$ |
| 6. TURN ON $2^{9}$ | -3.03100 | -2.96875 | HOLD $2^{9}$ |
| 7. TURN ON $2^{8}$ | -3.03100 | -3.04688 | RESET $2^{8}$ |
| 8. TURN ON $2^{7}$ | -3.03100 | -3.00781 | HOLD $2^{7}$ |
| 9. TURN ON $2^{6}A$ | -3.03100 | -3.02734 | HOLD $2^{6}A$ |
| 10. TURN ON $2^{6}B$ AND $2^{6}D$ | -3.05053 | -3.04687 | RESET $2^{6}B$ |
| 11. TURN ON $2^{5}$ | -3.04077 | -3.04687 | HOLD $2^{5}$ |
| 12. TURN ON $2^{4}$ | -3.04565 | -3.04687 | HOLD $2^{4}$ |
| 13. TURN ON $2^{3}$ | -3.04809 | -3.04687 | RESET $2^{3}$ |
| 14. TURN ON $2^{2}$ | -3.04687 | -3.04687 | HOLD $2^{2}$ |
| 15. TURN ON $2^{1}$ | -3.04748 | -3.04687 | RESET $2^{1}$ |
| 16. TURN ON $2^{0}$ | -3.04717 | -3.04687 | RESET $2^{0}$ |

NEGATIVE CONVERSION

FIG. 3

INVENTOR.
HJALMAR OTTESEN
BY
Fraser and Bogucki
ATTORNEYS

United States Patent Office 3,495,235
Patented Feb. 10, 1970

3,495,235
ANALOG TO DIGITAL CONVERTER

Hjalmar Ottesen, Boulder, Colo., assignor to International Business Machines Corporation, a corporation of New York Filed Mar. 10, 1966, Ser. No. 533,198
Int. Cl. G08c 1/00
U.S. Cl. 340—347 15 Claims

ABSTRACT OF THE DISCLOSURE

An analog to digital converter of the successive approximation type has first and second converters coupled between a single power supply and separate inputs of a comparator via reference and summing junctions respectively. Analog input voltages having the same polarity as the power supply voltage are applied to the summing junction to serve as a reference voltage for operation of the first converter, while input voltages of opposite polarity are summed with a voltage from a separate SIGN stage in the second converter actuated during the first step of operation to provide a two's complement reference voltage. Logic circuitry advances through the more significant bits represented by the first converter to provide a voltage at the reference junction approximately equal to the summing junction voltage, a dummy bit being added at the least significant stage to insure that the reference junction voltage exceeds that of the summing junction. The less significant stages represented by the second converted are then advanced through until the summing junction voltage equals the reference junction voltage, whereupon the digital values in the first and second converters are utilized to provide the desired digital value.

The present invention relates to electronic circuitry and more particularly to circuitry for converting analog signals to digital values.

There are many well-known prior art methods or systems for converting analog signals to digital signals. One type of analog to digital converter which is well-known in the prior art is a successive approximation type of unit. In the successive approximation type converters there may be some confusion as to whether the conversion function is analog to digital or vice versa. The confusion arises because the analog signal is generated simultaneously with the digital representation of the signal. In all converters of this type it is possible, at least in theory, to interchange the significance of the reference and generated signals. In the following description this equivalence should be understood.

The successive approximation type of converter normally includes a register for storing digital numbers and some method of providing an analog signal representative of the generated digital number stored in the register. The input or reference analog signal which is to be measured is then compared to the generated analog signal and, if the two signals differ by more than a certain predetermined value, the number stored in the digital register is changed thereby changing the magnitude of the generated analog signal. The generated analog output after each value change is successively compared to the analog input signal and the digital number stored in the register continues to be changed under the control of a logic network until the generated signal is substantially equal to the analog input signal. The register then has a digital number stored in it which accurately represents the magnitude of the input signal.

Converters which utilize the successive approximation principle of analog to digital conversion require sources of reference currents or one or two sources of reference voltage that are extremely stable. The polarity of the reference source may or may not be the same as the analog input signal. This invention consists of a successive approximation system which is compatible with single ended inputs of either polarity.

In a single ended input system only one line is available and the input voltage must appear between this line and the system ground. Prior art systems to accommodate bipolar input signals have used a plurality of methods. All of the known methods have been expensive to build except the double pole-single throw switch system and the latter system will not work with single ended input signals. A possible method of bipolar operation with single ended input signals is to provide two sets of reference sources for the ladder networks in the converter. A system that utilizes this technique is shown in U.S. Patent No. 3,092,824. The major disadvantage in this type of system is that stable reference sources are very expensive. Plural references may be furnished either by two precision power supplies or by a single precision power supply which will provide both a positive and a negative reference signal.

Another known system handles bipolar single ended inputs by selectively applying an appropriately poled bias to the summing junction. An example of such a system is shown in a copending application entitled "Bipolar Digital to Analog Converter," Ser. No. 420,879, filed Dec. 24, 1964 (now Patent No. 3,403,393), by David H. Screens, that is assigned to the assignee of the present invention. However, two power supplies are required for proper operation and such a system is not applicable to the present invention.

One of the major improvements provided by the present invention over prior art systems is that the cost of the power supply has been substantially reduced. The cost of one power supply that has both a positive and negative output is more than one and one-half times as much as a power supply that has only a positive or a negative output signal. The present invention utilizes a single power supply for a stable reference signal in low cost, high resolution and high speed analog to digital converters. The single power source supplies the reference signal to a bipolar single ended analog to digital converter of the successive approximation type, thus realizing a considerable saving in the cost of the converter.

An object of the present invention is to provide an improved single ended analog to digital converter.

It is a further object of this invention to provide a low cost analog to digital converter for bipolar single ended operation.

It is a still further object of the present invention to provide an analog to digital converter operating with a higher degree of accuracy, stability and linearity than prior art analog to digital converters.

It is another object of this invention to provide extremely high speed, high resolution analog to digital conversion of an input signal.

It is a still further object of this invention to provide a unipolar reference signal source, either current or voltage signals, for use with an analog to digital converter operable with bipolar analog input signals.

In brief, particular arrangements in accordance with the invention may comprise the parallel combination of a plurality of converters connected to cooperate with a sequencing logic network and a comparator to convert bipolar analog input signals received at the comparator input to digital signals. The converters, which may be powered by a single precision power supply, respond to input signals from the logic network to produce analog signals for comparison with an analog input signal by the comparator. The logic network sequentially activates the converters to effect approximate and then exact comparisons, but after the first converter is fully activated its output signal is used as a part of the reference signal for the second converter. The digital combination provided by the converters upon exact coincidence represents a digital value corresponding to the analog input signal.

In accordance with a preferred embodiment of the invention, first and second converters are controlled by a sequencing logic network and have their outputs coupled to respective ones of the two inputs of a comparator, the output of which is coupled to the logic network. The junction of the second converter output and the associated comparator input comprises a summing junction which receives the bipolar input signals. Each of the converters includes a plurality of registers coupled to be controlled by the sequencing logic network, and in turn controlling individual portions of a ladder network. The sequencing logic network sets successive values into the registers of a first of the converters, to generate an analog signal which is substantially equal to the analog input signal, as determined by the comparator. The value represented by the settings of the registers for the first converter corresponds to the higher order digits. After the first converter has been operated, its value is retained and the sequencing logic network controls the second converter to apply analog signals to the associated comparator input. A second comparison and adjustment sequence is then undertaken to effect more exact comparison and to establish the lower order bits in the registers of the second converter.

In accordance with an aspect of the invention, a register in the second converter may provide a signal to the summing junction which represents the 2's complement of the analog input signal when the polarity of the input signal is opposite the polarity of the analog reference signal generated at the first converter output. This arrangement enables a single ended input analog to digital converter having simplified circuitry at a greatly reduced cost to respond to bipolar analog input signals rapidly and effectively. Furthermore, only a single power supply and comparator need be provided despite the presence of more than one converter in the circuit.

In accordance with a further aspect of the invention, lower order bit signals in the second converter may be attenuated by a T network of resistors coupled between the second converter output and the summing junction. The ladder network in the second converter is thus enabled accurately to represent attenuated voltages at the summing junction, thereby increasing the accuracy and efficiency of the circuit.

In accordance with a still further aspect of the invention, a register in the first converter may be arranged to provide a dummy bit signal to increase the analog reference signal from the first converter sufficiently to insure that the reference signal is greater than any signal appearing at the summing junction. In this manner, the difference between the reference signal and the analog input signal as determined by the comparator has a chosen polarity and the digital signals stored in the respective registers of the first and second converters can be subtracted to provide the desired digital value.

The foregoing and other objects, features and advantages of the invention will be apparent from the following more particuar description of a preferred embodiment of the invention, as illustrated in the accompanying drawings, in which:

FIGURE 2 is a chart showing the steps in the conversion of a positive input signal; and FIGURE 3 is a chart showing the steps in the conversion of a negative input signal.

Figure 1:
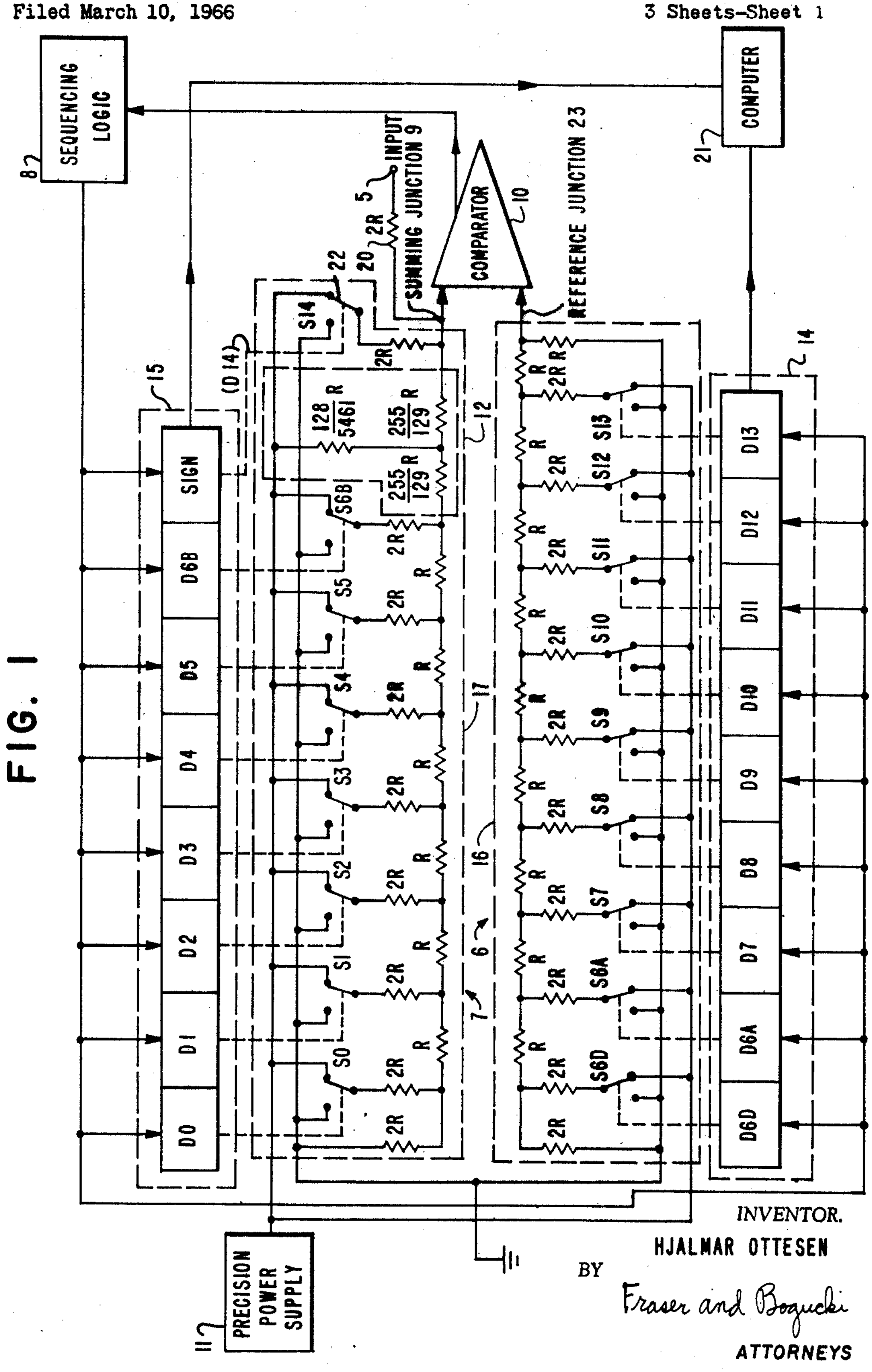
FIGURE 1 shows an overall schematic diagram of a preferred embodiment of the present invention.

FIG. 1 illustrates the arrangement and operation of the major components of the analog to digital converter of the present invention. The analog to digital converter system of this invention includes an analog signal input 5, a first digital to analog converter 6, a second digital to analog converter 7, a digital sequencing logic circuit 8, a summing junction 9, a reference junction 23, a comparator 10, and a precision power supply 11. A first digital register and timing ring 14, having nine positions designated D6D, D6A, D7, D8, D9, D10, D11, D12 and D13, is associated with the first digital to analog converter 6. A second register and timing ring 15, having eight positions designated D0, D1, D2, D3, D4, D5, D6B and SIGN, is associated with the second digital to analog converter 7. There is a ladder network individually associated with each converter and each digital register; ladder network 16 operates with register 14 and ladder network 17 operates with register 15.

The ladder networks 16, 17 include a plurality of network switches 22, individually designated S0 through S14, in correspondence to the register positions to which they are coupled, with the S14 switch being coupled to the SIGN position of the second register 15. The ladder networks 16, 17 are conventional binary ladder networks that include a plurality of series arms having a resistance value of R and a plurality of parallel legs having a resistance value of 2R. The series resistors may be respectively designated by any letter but in the present instance are designated as R, and the plurality of parallel resistors, having a resistance value of 2R, are merely designated 2R. The switches 22 are utilized to connect the various parallel legs of the ladder networks to either ground or the precision power supply 11. Each switch is shown as a single throw, double pole switch having one pole connected to the percision power supply 11 and the second pole of each switch connected to ground. Ladder networks which are utilized in converters operate upon a well-known principle which will be described briefly. The voltage applied between reference junction 23 and ground by the digital to analog converter is a function of the state of the various switches. The voltage applied between reference junction 23 and ground by moving the second switch S12 in the sequential series to the power supply position is one-half of the voltage applied between the reference junction 23 and ground by moving the first switch in the sequential series from the ground position to the power supply position. Each switch in a ladder network thus has one-half the effect of the preceding switch in the sequential series starting with the first switch to be operated.

A binary one imposed on a particular digital position of the registers 14 or 15 designated D0 through D13 causes the switch associated with the position of the register to move from the ground position to the power supply position. The details of the circuitry for actuating switches 22 from the registers 14, 15 and the details of switches 22 will not be shown since any well-known circuitry will operate the present invention. The details of such prior art circuitry are shown in the copending application Ser. No. 115,113, filed June 6, 1961, by Howard Funk et al., that is assigned to the assignee of the present invention. Inasmuch as each switch has one-half the effect of the preceding switch, the number which is stored in the registers that hold the sequential switches 22 after operation of the comparator is the binary representation of the analog voltage applied to the input terminal 5. An attenuation network 12 provides a T network of resistors to assist in the determination of the lower bits. In the embodiment of FIG. 1 the attenuation will be 1/256 of full scale value referred to the input. Also here the ladder network 17 will represent attenuated voltage at the summing junction 9 similar to that discussed for the reference junction 23.

In operation the analog voltage from the input 5 is applied through an input resistor 20 to the summing junction 9. Let the precision reference voltage supply be negative for the discussion to follow. The comparator reference voltage as referred to the input is initially zero. The comparator 10 as this point is able to make a decision as to the polarity of the input voltage, by comparing it to the voltage generated at the reference junction 23 which is at ground potential initially. Negative reference voltages are thereafter created at the reference junction 23 by the digital to analog converter 6 shown in the particular embodiment of this invention. Therefore, the system operates by presenting values of positive input voltages in the 2's complement form. Specifically, the SIGN position of the second register 15 is used to provide a negative fixed level at the summing junction 9, from which the input voltage is effectively subtracted to provide the needed negative 2's complement signal. The full scale voltage of the converter may be set at any value; however, in the example which is illustrated herein, full scale value was set at ±5 volts. If the reference supply 11 were positive, then the negative values of input voltage would be represented in 2's complement form.

The comparator thus responds to the polarity relationship by operating the SIGN position of the register 14, to indicate the polarity of the input signal. The sequencing logic 8 then operates or steps to activate D13 in the first register 14 and the coupled portion of the ladder network 16 and applies the voltage generated by the digital to analog converter 6 to the comparator 10. The results of the comparison determine the setting of the particular position in the register 14, and the sequence is then repeated for the succeeding lower order positions in series. The digital value stored in the register 14 thus changes the analog voltage that the first digital to analog converter 6 applies to the comparator 10. This process of successive approximation continues until the analog voltage generated by the digital to analog converter 6 referred to the input is substantially equal to the analog input voltage applied to terminal 5. Thus, the converter 6 has been operating as with the voltage applied to the input 5 serving as the reference to determine the digital value of the input voltage to an eight bit accuracy, for the embodiment shown in FIG. 1. In this sense, therefore, the converter 6 performs an analog to digital conversion; however, in terms of internal system operation the generated analog value is perhaps most readily visualized and more conveniently referred to. Consequently, the converter 6 has for this reason been designated as digital to analog.

Subsequently, the analog value is held by the first converter 6 while the registers in the second converter 7 are then sequenced until a final comparison is made. In this sequence, the signal level held at the reference junction 23 is used as the basis for comparison, although the input signal 5 also remains fixed.

The comparator 10 compares the voltage at summing junction 9 to a negative voltage when a negative analog input voltage is applied to terminal 5 and compares a positive input voltage in its 2's complement negative voltage form to a negative voltage reference created at the reference junction 23. The 2's complement negative voltage is created by switching in the SIGN bit (S14) when the input voltage is positive, as previously explained. As a consequence, this system can handle bipolar single ended inputs with a single unipolar precision power supply 11. In the given case, all voltages at the summing junction will be negative and compared to negative references.

The present invention according to FIG. 1 also accomplishes the conversion of an analog voltage of negative polarity to a binary number so that the binary number which represents the magnitude of the analog input voltage is presented in direct reading form when the absolute value is finally determined in the computer 21. However, if a positive input voltage has been applied to the input terminal 5, the 2's complement of the binary number that represents the magnitude of the analog input signal will be represented in the associated computer 21. By changing the polarity of the reference supply 11, positive numbers are represented directly and negative numbers in 2's complement form.

As is well-known in the art, the voltage at the summing junction 9 is the sum of the voltage applied to the summing junction by the analog to digital converter 7 and the voltage applied to the summing junction 9 from the input terminal 5. An input resistor 20 which serves as a scaling resistor must be placed between the input terminal 5 and the summing junction 9. The input resistor 20 allows the system to handle higher voltage input signals than might otherwise be possible because it attenuates the voltage at summing junction 9 due to the input voltage. Resistor 20 normally will have a magnitude 2R which is equal to the value of the resistors in the legs of the ladder networks. If the value of resistor 20 is changed, the impedance of ladder 16 as seen from the comparator (impedance at the reference junction 23) must be changed so that it corresponds to that of ladder 17 (impedance at the summing junction 9).

The sequencing logic 8 is any appropriate logic for a successive approximation analog to digital converter. The function of the sequencing logic, as previously described in general terms, is to operate the registers 14, 15 and associated switches until the comparator 10 indicates that the voltage which is being generated by the ladder network is substantially equal to the reference voltage applied to the comparator. Sequencing logic for performing the requisite step functions required in this invention is shown, for example, in application Ser. No. 115,113, filed June 6, 1961, by Howard Funk et al. now Patent No. 3,216,003. It is always possible as an alternative method to manually step the system through its sequence of operations.

The circuitry which determines the sign of the voltage is entirely conventional and will not be shown in detail herein. The sign of the input voltage is determined by the comparator when it compares the voltage at the summing junction as referred to the input voltage and the comparator reference voltage which is zero for this operation with respect to the input and the comparator then makes the decision whether or not the input voltage is positive or negative. For convenience in writing the binary numbers and as is conventional, the sign or S bit is written to the left of the highest order binary bit with the highest order bits to the left. In the present system, however, the SIGN bit is located in the second register 15 in order to provide the polarity determination here described. The value of the voltages at the summing junction and at the reference junction is referred to the value of the voltage at the input. Such a reference provides a convenient method of referencing and makes the value of the voltages at the input node 5 approximately three times greater than the value of the voltages at the summing junction 9 if these voltages were measured directly to ground from the summing junction. In a similar manner, the voltages at the reference junction 23 are the negative reference voltages as referred to the input and such a reference provides in effect a value three times larger than the actual value at the reference junction 23 if this voltage was measured directly to ground.

The magnitude of the resistors in the ladder is a design feature determinable by engineering considerations that need only be discussed generally. The value of the resistors must be decided in accordance with a required value of input impedance needed at terminal 5 and in accordance with the allowable output impedance variations for power supply 11 and saturation resistance of the switches 22. Another factor which must be taken into consideration in the design of the converter of this invention or any successive approximation type analog to digital converter is the allowable input impedance of comparator 10. The value of the resistor designated R is determined by the particular operating characteristics of the other elements of the invention, but the resistors designated 2R must have a value twice that which is given to the resistor R. In a similar fashion, the output voltage or current which is used as a reference is not particularly important to the invention. However, the maximum range of any signal is substantially equal to the magnitude of the voltage generated by power supply 11 if the input resistor 20 is equal to 2R. In the described embodiment of this invention, the full scale voltage is determined to be ±5.00000 volts. The sequencing of the switches S13 through S0 will supply potentials equal to −2.50000, −1.25000, −0.62500, −0.31250, −0.15625, −0.07813, −0.03906, −0.001953, etc. to −0.00030 or combined approximately −5 volts, and S14 will produce a potential equal to −5.0000 volts referred to the input. Any input voltage which is greater than ±5 volts will be registered as ±5 volts which is full scale.

The detailed operation of the system can probably be best understood by assuming a positive voltage of a predetermined value applied to the input 5 and describing the sequence of operations and then assuming a negative voltage of identical predetermined value applied to input 5 and describing the sequence of operations. The positions of the registers 14, 15 are normally set to the zero state so that all of the switches 22 are connected to the ground position. The first step, or cycle 1, as ordered by the sequencing logic is the sign comparison of the input voltage. If the decision of the comparator 10 is that the input voltage is positive, then the SIGN position of the register 15 indicative of the sign is turned on simultaneously with the switch S13 associated with the D13 position of the register 14 during step 2 of the sequencing logic. There is no provision for resetting the switch S14 associated with the SIGN register position and therefore for all positive values of input voltage the SIGN register position will indicate a 1 state. If a negative voltage is determined to be applied to the input terminal 5 by the comparator 10 in the first sequence of operations, then the sign switch S14 is never activated and a zero is indicated in the SIGN register position. If the input voltage has been determined to be of positive polarity by the comparator 10, the voltage at the summing junction 9 when referred to the input becomes the negative numerical difference between the −5 volts which is applied at the summing junction with reference to the input and the value of the positive input voltage which is applied at the summing junction. The negative numerical difference will be the true analog representation of the 2's complement of the positive voltage as referred to the input.

The operation of this system will be explained showing the conversion of a positive input voltage having a magnitude of +3.03100 volts and the conversion of a negative input voltage of the same value. FIG. 2 and FIG. 3, respectively, depict in chart form these conversions. Initially all voltage sources are off and the comparator balanced, and the reference source and the sequencing logic are then activated. The sequencing logic moves to step 1 to determine the sign of the input voltage. The voltage at the summing junction 9 as referred to the input in the example is a +3.03100 volts and the comparator reference voltage as referred to the input is 0.00000 volt. The decision of the comparator 10 is that the applied voltage is positive. The sequencing logic then proceeds to step 2 and turns on the switch S14 associated with the SIGN position in the register 15 and changes switch S13 from ground position to power supply position. The value of the voltage at the summing junction as referred to the input is then −1.96900 or the sum between the positive input voltage and the negative reference voltage of −5.000 volts. During step 2, the value of the comparator reference voltage when referred to the input is −2.50000 volts. The comparator 10 determines that the numerical value of the comparator reference voltage as referred to the input voltage is greater than the value of the voltage at the summing junction 9 referred to the input voltage. The decision of the comparator 10 is to reset to zero or ground potential switch S13. The sequencing logic 8 in response to the comparator then turns on the switch S12 and resets switch S13 to zero. The voltage applied at the summing junction with reference to the input remains at a −1.96900 but the comparator reference voltage when referred to input voltage is now halved by the successive approximation of the ladder network. A −1.25000 volt level is the value of the comparator reference voltage when referred to the input voltage. The comparator 10 decides to hold switch S12 and the sequencing logic turns switch S11 to the on position. The voltage at the summing junction as referred to the input voltage continues to remain at −1.96900 volts until the sequencing logic 8 has activated switch S6A and will not be referred to again in this description until the sequencing logic has activated the switch S6A. Switch S11 when activated produces a comparator reference voltage when referred to the input voltage of −1.87500 volts. The decision of the comparator is to hold switch S11. The sequencing logic activates switch S10. The voltage at the reference junction 23 as referred to the input voltage is now −2.18750 volts and the decision of the comparator is to reset switch S10 as the value has exceeded the value of the reference voltage which is the voltage at the summing junction when referred to the input voltage. The next step, as the sequencing logic continues to function, is the activation of switch S10. The comparator reference voltage as referred to the input is now −2.03125 volts or greater than the voltage at the summing junction referred to the input voltage and the decision of the comparator is to reset S10. The sequencing logic next activates switch S8 and the value of the comparator reference voltage referred to the input voltage is −1.95313 volts and the decision of the comparator is to hold switch S8. Switch S7 is activated and the comparator reference voltage has a value of −1.99219 volts. The comparator 10 resets switch S7. Switch S6A is activated and at this point the value of the reference voltage at the comparator when referred to the input is −1.97266 volts. The comparator thus decides to reset switch S6A. The comparator reference voltage as referred to the input voltage generated by the converter 6 is now fixed. The value remains fixed at the 8 bit accuracy of converter 6 and is the reference voltage for the operation of converter 7.

The sequencing logic activates switch S6B and switch S6D simultaneously. The successive approximation continues with the voltage at the summing junction with reference to the input now −1.98853 volts while the comparator reference voltage when referred to the input remains constant at the value of −1.97266 volts. The comparator resets switch S6B. Switch S6D is not reset but in all instances inserts a dummy bit in the ladder network 16. The dummy bit ensures that the reference voltage is more negative than the voltage at the summing junction 9. Consequently, no ambiguity can arise due to the operation of the two registers, and subsequent comparisons can be on the basis of a known polarity relationship. The sequencing logic 10 continues to activate switches until the comparator decides whether or not to reset switch S0.

The bits as stored in the registers 14, 15 are fed into computer 21. The computer adds the D6D bit to register 14 and then subtracts the value in register 15 from the total value in register 14. The resultant is the digital representation of +3.03100 volts. The values in the register are illustrated in graphic form in the following table:

| | S | 13 | 12 | 11 | 10 | 9 | 8 | 7 | 6A | 6D | 6B | 5 | 4 | 3 | 2 | 1 | 0 |
|---|---|---|---|---|---|---|---|---|---|---|---|---|---|---|---|---|---|
| Register 14 | 1 | 0 | 1 | 1 | 0 | 0 | 1 | 0 | 0<br>1 ← | 1 | | 0 | 0 | 0 | 0 | 0 | 0 |
| Register 15 | 0 | 0 | 0 | 0 | 0 | 0 | 0 | 0 | | | 0 | 0 | 0 | 1 | 1 | 0 | 0 |
| Total | 1 | 0 | 1 | 1 | 0 | 0 | 1 | 0 | | | 0 | 1 | 1 | 0 | 1 | 0 | 0 |

The operation of the system in accordance with the invention in conversion of a negative input voltage is similar to that of a positive voltage, as will be evident from FIG. 3. The comparator 10 does not activate switch S14 to the SIGN position in the register 15. The voltage at the summing junction as referred to the input through the operation of switch S6A is equal to the value of the input voltage. The comparator reference voltage as referred to the input voltage is changed by successive approximation until the value is approximately that of the input voltage. The voltage at the summing junction 9 as referred to the input voltage is successively compared by activation of switches S6B through S0 to the constant comparator reference voltage as referred to the input.

This invention utilizes the first converter 6 as a digital to analog converter and subsequently the digital value stored in the register associated with the first converter as a reference base for the second digital to analog converter 7. The speed of the conversion of an input signal is substantially increased because of the added redundancy in D6D and D6B without additional cost. The speed-cost advantages of this system derive from a number of factors related to the settling time of ADC comparators and the use of the redundancy bits. ADC comparators settle to provide an output determination at speeds which bear an inverse relationship to the applied difference signal value $\Delta E$. When $\Delta E$ is small (e.g. less than approximately 200 microvolts) the comparator may require as much as 5–10 microseconds in going from the saturated to the unsaturated state. The redundancy bits insure not only the correct polarity in the determination made by the second comparator, but introduce a fixed digital error that speeds up the comparator decision. This will be evident by comparing the differences between the second and third columns in FIG. 2, at steps 10 to 16, to the continuous sequence of diminishing differences that would exist in a straightforward 14 bit converter. Although other expedients are available for decreasing comparator settling time, the present system increases speed without a concomitant cost increase.

Although it has not been set forth, the settings of the switches in this invention are normally accomplished simultaneously for any two switches in sequence. The description might have indicated that the voltage is first removed from one position and then the next voltage is applied to the summing junction or to the reference comparator. Such successive steps were not detailed purely for ease of description. Transient spikes must not occur between cycles and in the design of the converter well-known techniques are utilized to prevent this generation of transient spikes.

As shown herein, the invention includes a precision power supply 11, which provides a constant voltage output, and ladder networks constituting voltage ladder networks. The invention can also be realized using analog current sources and current type ladder networks, where the current sources may or may not be identical. But there must be one current source for each register bit. The switching circuitry is similar to that shown in a publication entitled "Current Switching in Analog to Digital Conversion Systems," by H. Ottesen, published in vol. VII, No. 11, April 1965, of the IBM Technical Disclosure Bulletin and in "Precision Current Sources Independent of Supply Voltage," by H. Ottesen, published in vol. VII, No. 10, March 1965, at page 8747 of the IBM Technical Disclosure Bulletin. It should thus be appreciated that the system shown herein could be designed using precise current sources rather than a precise voltage source. If current sources are used they are individually coupled into the various terminals of the appropriate ladder networks. Whether voltage or current sources are used, there is necessity for only one precision power supply, however, the circuit may and will include other sources of power necessary for various other functions. The sources to furnish the other power requirements need not be precision reference sources nor have any special degree of accuracy and can typically be supplied from the computer central power unit. These power sources have a minimal cost and are readily available on the commercial market. The negative input voltage values will always be in the correct binary form after the subtraction in the computer while positive input voltage values will be in the 2's complement form if a negative reference source is used. If a positive reference source is used, then the positive input voltage values will be in the correct binary form and the negative input voltage values will be in the 2's complement form.

As shown in FIG. 1, a ladder network section 12 of somewhat irregular values is employed in conjunction with the ladder network 17. These values provide for greater linearity in the low order binary digits.

If the input voltage to be converted is known to about ±0.5% accuracy of a mean value, the first nine digits in the binary equivalent of the mean can be utilized to preset register 14. The conversion is then rapidly accomplished by utilizing only the second converter 7. Such ability to preset the register 14 would speed the conversion up until the converter would be able to operate at speeds up to 100 kilocycles or more. Comparator 10 can be described as a detector which will detect the presence of certain predetermined difference voltages between the reference junction 23 and the summing junction 9.

There has been described above an analog to digital converter having low cost, with high resolution and high speed. The analog to digital converter described above features the use of two converters sharing the same comparator. One converter works first as a converter, and then as a digital to analog converter utilizing the value of the voltage as set forth in its associated register. This high speed, low cost analog to digital converter system requires only a unipolar reference source, either current or voltage, for bipolar operation. This invention provides a speed-cost factor for analog to digital converters which is at least 50% better than the prior art analog to digital converters.

Moreover, although the particular system described by way of illustration employs switches and registers for performing a portion of the logic and circuit connection functions, alternative systems might well include other types of circuit components. Various aspects and advantages have been set forth for the system of the present invention which will enable those skilled in the arts to utilize any portion or the entire system thereof to enhance the operation of analog to digital conversion systems.

While the invention has been particularly shown and described with reference to a preferred embodiment thereof, it will be understood by those skilled in the art that various changes in form and details may be made therein without departing from the spirit and scope of the invention.

What is claimed is:

1. An analog to digital converter of the successive approximation type comprising:
   - a comparator having first and second inputs and an output;
   - a first digital to analog converter including means for storing digital numbers and coupled to provide an analog signal at the first input of said comparator representative of each stored digital number;
   - a second digital to analog converter including means for storing digital numbers and coupled to provide an analog signal at the second input of said comparator representative of each stored digital number;
   - input means providing an analog signal to be converted to the second input of said comparator; and
   - control means responsive to the output of said comparator and coupled to each of said means for storing digital numbers in said first and second digital to analog converters, for changing the stored digital numbers in said first digital to analog converter until the analog signal at the first input of said comparator is substantially equal to the analog signal at the second input of said comparator, and thereafter changing the stored digital numbers in said second digital to analog converter until the analog signal at the second input of said comparator is precisely equal to the analog signal at the first input of said comparator.

2. An analog to digital converter of the successive approximation type comprising:

a comparator having first and second inputs and an output;

a first digital to analog converter having a plurality of register stages, each capable of having a different digital value stored therein, and an output coupled to the first input of said comparator, said first digital to analog converter providing an analog signal at the output thereof representative of the digital values stored in the register stages thereof;

a second digital to analog converter having a plurality of register stages, each capable of having a different digital value stored therein, an output coupled to the second input of said comparator, and a SIGN register stage coupled to provide an analog signal to said output when activated, said second digital to analog converter providing an analog signal at the output thereof representative of the digital values stored in the register stages thereof, and the junction between the second input of said comparator and the output of said second digital to analog converter defining a summing junction;

input means providing an analog signal to be converted to the summing junction; and control means responsive to the output of said comparator and coupled to the SIGN register stage and to change the stored digital values in the register stages of said first and second digital to analog converters, said control means being responsive to the comparator output when the analog signal to be converted is of predetermined polarity to activate the SIGN register stage and provide the analog signal therefrom to the summing junction, said analog signal from the SIGN register stage combining with the analog signal to be converted to form the two's complement thereof, said control means thereafter successively changing the stored digital values in the register stages of said first digital to analog converter until the combined signals at the summing junction are substantially equal to the analog signal at the first input of said comparator, then successively changing the stored digital values in the register stages of said second digital to analog converter until the combined signals at the summing junction are precisely equal to the analog signal at the first input of said comparator.

3. The invention as set forth in claim 2, wherein said first digital to analog converter includes a dummy register stage, said dummy register stage being operated by the control means to increase the analog signal at the output of said first digital to analog converter to a value slightly greater than the value of the combined analog signals at the summing junction immediately prior to the changing of the stored digital values in the register stages of the second digital to analog converter.

4. An analog to digital converter for converting bipolar analog input voltages to corresponding digital values comprising:

means for providing a reference voltage of one polarity and predetermined value;

a first digital to analog converter coupled to receive said reference voltage and having successive register stages and an output, each of said register stages being normally reset and being operative to provide a voltage which is a different submultiple of said reference voltage to the output when set;

a second digital to analog converter coupled to receive said reference voltage and having successive register stages and an output, each of said register stages being normally reset and being operative to provide a voltage which is a different submultiple of said reference voltage to the output when set;

means for applying an analog input voltage to be converted to the output of said second digital to analog converter;

comparator means having first and second inputs respectively coupled to the outputs of said first and second digital to analog converters, and operative to provide at an output thereof an indication of whether the total voltage at the first input exceeds or is less than the total voltage at the second output; and control means responsive to the indication at the comparator output for successively setting or resetting the register stages in said first digital to analog converter until the total voltages at the first and second comparator inputs are substantially equal, and thereafter successively setting or resetting the register stages in said second digital to analog converter until the total voltages at the first and second comparator inputs are exactly equal.

5. The invention as set forth in claim 4 above, further including a SIGN register stage in said second digital to analog converter for applying an analog voltage having the same value and polarity as the reference voltage to the second input of said comparator when set, and wherein said control means responds to an indication at the comparator output that the analog input voltage to be converted as a polarity opposite said one polarity of the reference voltage to set the SIGN register stage and apply the analog voltage therefrom to the second comparator input, the analog voltage from the SIGN register stage combining with the analog input voltage to provide a voltage which is the two's complement of the analog input voltage.

6. An analog to digital converter of the successive approximation type including:

a comparator having first and second inputs;

a reference junction at the first input of the comparator;

a summing junction at the second input of the comparator;

first and second digital to analog converters, each having register means for storing binary numbers and means for generating analog signals representative of the binary numbers stored in the register means, the generated analog signals of said first and second digital to analog converters being respectively provided to the reference junction and the summing junction;

sequencing logic means for changing the binary numbers in the register means of said first and second digital to analog converters;

input means for providing an analog signal to be converted to the summing junction; and control means including said sequencing logic means for controlling the operation of said first digital to analog converter to change the binary numbers in the register means thereof until analog signals at the first and second comparator inputs match one another, and activating and controlling the operation of said second digital to analog converter to change the binary numbers in the register means thereof until analog signals at the first and second comparator inputs are precisely equal.

7. The invention as set forth in claim 6 above, further including means for insuring that the total analog signal generated by said first digital to analog converter has an absolute value greater than the total analog signal at said summing junction and the same polarity.

8. The invention as set forth in claim 7 above, further including means for subtracting redundant digital values from the register stages in said first and second digital to analog converters to obtain a digital representation of the analog input signal to be converted.

9. An analog to digital converter for converting bipolar input voltages to corresponding digital values, comprising the combination of:

comparator means having first and second inputs respectively defining a reference junction and a summing junction;

means providing a reference voltage of constant value and one polarity;

first and second resistor network means respectively coupled to the reference junction and the summing junction;

first and second switching means coupled between respective ones of the first and second resistor network means and the reference voltage means, each of said switching means being operative to provide voltages which are different submultiples of the reference voltage to the associated reference or summing junction via the associated resistor network means as the status thereof is changed;

first and second register means respectively associated with said first and second switching means, each of said register means storing a digital number representative of the status of the associated switching means;

means for providing bipolar analog input voltages to be converted to the summing junction; and sequencing means responsive to the comparator, said sequencing means changing the status of the first switching means until the total analog voltage provided at the reference junction by the first resistor network means nearly equals the total analog voltage at the summing junction, and thereafter changing the status of the second switching means until the total analog voltage provided at the summing junction by the second resistor network means and by the means for providing bipolar analog input voltages is precisely equal to the total analog voltage at the reference junction.

10. The invention as set forth in claim 9 above, wherein said second switching means includes a switch coupled to apply the reference voltage directly to the summing junction when activated, and wherein the sequencing means is responsive to an indication from the comparator upon commencement of each new conversion process that an analog input voltage at the summing junction is of opposite polarity from said one polarity of the reference voltage to activate said switch and thereby apply the reference voltage directly to the summing junction, said reference voltage combining with the analog input voltage at the summing junction to provide an analog voltage of said one polarity and which is the two's complement of the analog input voltage of said other polarity.

11. The invention as set forth in claim 9 above, wherein said first switching means includes a switch for providing an analog voltage to the reference junction when activated, and wherein the sequencing means activates said switch after the status of said first switching means has been changed to render the total analog voltage provided at the reference junction nearly equal to the total analog voltage at the summing junction to increase the total analog voltage at the reference junction above that at the summing junction and enable the status of the second switching means to be changed using a known polarity relationship between the summing and reference junctions.

12. The invention as set forth in claim 9 above, wherein each of said first and second register means comprises a plurality of bistable registers sequentially arranged from the highest order bit to the lowest order bit in the sequence, the highest order bit of the second register means being one order below the lowest order bit of the first register means.

13. The invention as set forth in claim 12 above, wherein each of said first and second switching means includes a separate dual-position switch associated with each bistable register of the associated register means, each switch resetting the associated register into a first state when in a first position and setting the associated register into a second state when in a second position, each switch further being operative to couple the associated reference junction or summing junction to ground through the associated resistor network means when in the first position and to couple the associated reference junction or summing junction to the reference voltage means through the associated resistor network means when in the second position.

14. The invention as set forth in claim 13 above, wherein each of said first and second resistor network means comprises a ladder network of resistors having a first plurality of resistors serially coupled to one another and to the associated reference or summing junction and a second plurality of resistors, each of which is coupled between a different one of the switches in the associated switching means and the junction between a different adjacent pair of the first plurality of resistors.

15. The invention as set forth in claim 14 above, further including a network of resistors coupled between the ladder network of resistors comprising the second resistor network means and the summing junction for selectively attenuating analog voltages provided the summing junction by the second resistor network means and the second switching means.

References Cited

UNITED STATES PATENTS

| | | | |
|---|---|---|---|
| 2,865,564 | 12/1958 | Kaiser et al. | 340—347 |
| 3,027,079 | 3/1962 | Fletcher et al. | 340—347 |
| 3,072,332 | 1/1963 | Margopoulos | 340—347 |
| 3,146,343 | 8/1964 | Young | 340—347 |
| 3,234,544 | 2/1966 | Marenholtz | 340—347 |
| 3,298,014 | 1/1967 | Stephenson | 340—347 |

MAYNARD R. WILBUR, Primary Examiner

GARY R. EDWARDS, Assistant Examiner

PO-1050
(5/69)

UNITED STATES PATENT OFFICE
CERTIFICATE OF CORRECTION

Patent No. 3,495,235 Dated February 10, 1970

Inventor(s) Hjalmar Ottesen

It is certified that error appears in the above-identified patent and that said Letters Patent are hereby corrected as shown below:

Column 12, line 32, for "as" read --has--.

SIGNED AND
SEALED
JUL 21 1970

(SEAL)
Attest:

Edward M. Fletcher, Jr.
Attesting Officer

WILLIAM E. SCHUYLER, JR.
Commissioner of Patents